US006643751B2

(12) United States Patent
Rosenquist et al.

(10) Patent No.: US 6,643,751 B2
(45) Date of Patent: Nov. 4, 2003

(54) SYSTEM AND METHOD FOR LIMITED ACCESS TO SYSTEM MEMORY

(75) Inventors: Russell M. Rosenquist, Plano, TX (US); David D. Baker, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 19 days.

(21) Appl. No.: 09/809,412

(22) Filed: Mar. 15, 2001

(65) Prior Publication Data

US 2002/0133680 A1 Sep. 19, 2002

(51) Int. Cl.[7] .............................................. G06F 12/14
(52) U.S. Cl. ...................................... 711/163; 711/164
(58) Field of Search ................................. 711/163, 164; 713/200, 201, 202

(56) References Cited

U.S. PATENT DOCUMENTS

| | | | | | |
|---|---|---|---|---|---|
| 4,388,695 A | * | 6/1983 | Heinemann | ................. | 711/163 |
| 5,027,317 A | * | 6/1991 | Pepera et al. | ............... | 711/163 |
| 5,721,872 A | * | 2/1998 | Katsuta | ....................... | 711/163 |
| 5,754,821 A | * | 5/1998 | Cripe et al. | .................. | 710/200 |
| 6,101,586 A | * | 8/2000 | Ishimoto et al. | ............ | 711/163 |

* cited by examiner

Primary Examiner—Hiep T. Nguyen
(74) Attorney, Agent, or Firm—Charles A. Brill; Wade James Brady, III; Frederick J. Telecky, Jr.

(57) ABSTRACT

A hardware latch for limiting access to protected system memory. An N-bit bus provides the instructions executed by the system to a combinatorial logic block (204). The combinatorial logic block (204) provides eight separate outputs and functions as a series of comparators. One input of each comparator is connected to the instruction bus, the other input of each comparator is hardwired to indicate the pattern that appears on the bus when a particular instruction is executed. The output from a given comparator is active when that particular instruction is applied to the instruction bus (202). A counter (208) counts the instructions and selects which output from the combinatorial logic block should be selected by multiplexer (206). If the output of the multiplexer is logic false, the sequence of instructions is broken and the counter (208) is reset. If the output of the multiplexer is logic true, the counter is allowed to continue incrementing. If the counter reaches eight, a flip-flop (210) representing the hardware gate can be written to. The output of the flip-flop (210) is gated with the write signal provided to the protected blocks to prevent the write operations when the gate is locked. Another logic gate (214) is provided to reset the counter if the instructions are executed out of a section of memory other than one of the protected blocks.

11 Claims, 4 Drawing Sheets

SYSTEM AND METHOD FOR LIMITED ACCESS TO SYSTEM MEMORY

FIELD OF THE INVENTION

This invention relates to the field of digital processing systems, more particularly to the control of memory in digital processing systems, and most particularly to methods and systems of limiting the access of some applications to certain portions of memory.

BACKGROUND OF THE INVENTION

Low-cost semiconductor random access memory (RAM) has enabled many advances in electrical appliances. This memory enables small devices without permanent magnetic storage to store large quantities of data. When this memory is non-volatile memory, such as FLASH™ memory, the data is stored even when power to the device is removed. Non-volatile RAM has enabled system designers to extend the life of a product and reduce product support costs, by enabling the non-volatile RAM to store system configuration and control data. This system data previously had to be hard-wired into the read only memory (ROM) of the appliance. Once assembled, the hard-wired memory is fixed and cannot easily be changed. Non-volatile memory allows the system to be reprogrammed to correct errors or to add functionality to the system at a later date.

The ability to update or add to the contents of the system memory, typically called firmware, is especially important in many hand-held devices such as personal digital assistants (PDAs) and modern scientific calculators. This ability enables these devices to download programs to increase or tailor the functionality of the devices to the needs of the users. For example, some PDAs are programmed with special software to record customer survey information, enabling those taking the surveys to enter their preferences directly into the device memory via the touch screen—thus eliminating the need for pencils, paper, and scanners.

Likewise, advanced calculators are programmed with specific software packages to expand the functionality of the calculators in various fields. For example, circuit analysis or stress analysis packages simplify everyday engineering tasks, while teaching packages, which may include processing routines and data, prepare classroom calculators for a series of classroom experiments.

While modern memory enables upgrades, the commercial feasibility of such upgrades is limited by the ability to extract reasonable royalties from the users of the packages. Without some sort of effective protection there is a great risk that the downloadable programs will be copied and the authors of the programs will not receive compensation adequate to ensure the continued supply of the programs.

The protection must make the programs difficult to copy. One way to make the programs difficult to copy is through encryption. Once the programs are installed in memory, however, it often is relatively easy to read the unencrypted program out of the memory. This is especially true in systems that allow execution of user-written programs. If the system does not enable a memory dump, the user often can write a program to dump the memory to an output device. Thus, what is needed is a method and system of limiting the ability of the user to access portions of the system memory without compromising the ability of the operating system to utilize the restricted portions.

SUMMARY OF THE INVENTION

Objects and advantages will be obvious, and will in part appear hereinafter and will be accomplished by the present invention which provides a method and system for limited access to system memory. One embodiment of the claimed invention provides a method of limiting access to a secure portion of memory. The method comprises the steps of: providing a memory having a system memory portion and a secure portion, providing a logic gate to prevent write operations to the secure portion of memory, and providing an access signal to open the logic gate. The access signal generated by the execution of a specific sequence of instructions from the system memory portion. The sequence of instructions typically is a sequence of eight instructions. According to one embodiment of the disclosed invention, the execution of the specific sequence of instructions must occur from a specific region of the system memory portion.

According to another embodiment of the disclosed invention, an electronic device is provided. The electronic device has a memory system comprising: a restricted block, a protected block, an unprotected block, and a memory controller. The memory controller only allows write access to the restricted block from within the restricted block, and only allows write access to the protected block from within the protected and restricted blocks. The memory controller only allows write access to the protected block upon the execution of a predetermined sequence of instructions. One embodiment of the disclosed invention requires a predetermined sequence of eight instructions. Another embodiment of the disclosed invention requires the predetermined sequence of instructions be executed from within the restricted block.

The method and system disclosed herein enable the distribution of software routines for electronic devices while limiting the risk of piracy. The routines typically are encrypted using a public-key/private-key encryption scheme. Each device has a unique key used to unlock the routine, allowing the routine to be stored unencrypted in the system memory. The memory controller limits the ability of a casual user to read out the routine in unencrypted form. Using the hardware gate taught by this invention provides sufficient protection to enable the market for aftermarket software for devices such as palm-top computers and hand held calculators.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

A new method and system for limiting access to system memory have been developed. The method and system utilize a hardware lock that prevents read and write operations from occurring in the system memory, or a partition of the system memory. This limits the ability of programs in the memory from dumping the contents of the memory, and limits the ability of a user from installing the types of programs that could dump the system memory.

Figure 1:
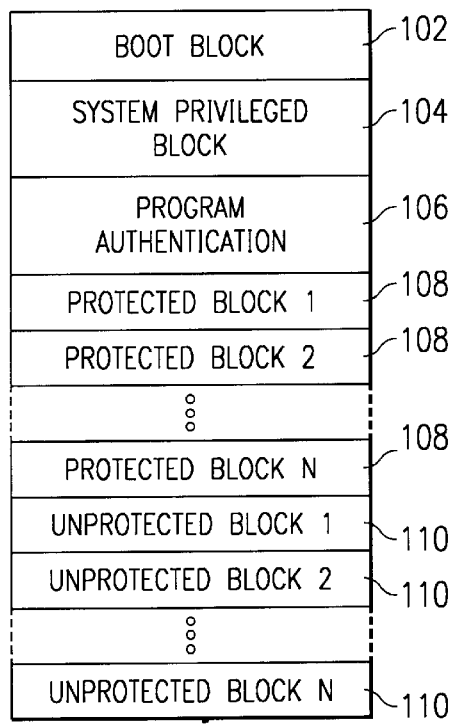
FIG. 1 is a memory map showing the basic memory partitions in a representative electronic device.

FIG. 1 is a memory map showing the major partitions of memory in a typical hand-held device such as an advanced calculator. The memory represented in FIG. 1 can be a single semiconductor device, or may be comprised of more than one memory component. While the entire memory preferably is a non-volatile memory, portions of the memory may be volatile memory. Not shown, but often present is a block of read only memory (ROM) that contains very basic routines to initialize the system. This block of ROM often copies itself into the boot block 102 of the memory map upon power-up of the device.

The boot block 102 of the memory stores the system initialization code, whether copied from a boot ROM, or permanently stored in the boot block. The boot block also contains the code for the core functions of the device. Additionally, depending on the device and the security arrangements for the device, the boot block 102 contains several codes and software routines designed to enable and restrict upgrades to the system. These codes and routines, which will be discussed in more detail below, include the device serial number, a software validation routine, a program download routine, a base software product number, and an encrypted software public key.

Another block of memory is the system privileged block 104. This block includes a non-volatile memory manager, and routines to load and transfer software license certificates. Yet another memory block is the program authentication block 106. The program authentication block 106 contains the certificate public key, a date-stamp public key, a data-stamp certificate, and certificate and license status information. Additional blocks include one or more protected blocks 108 and one or more unprotected blocks 110.

Key to preventing copying of the program upgrades is the ability to prevent user access to the portions of the memory containing the programs. This undesired access can come in the form of user-written programs and downloaded programs. One way to limit access to portions of the memory is to use a logic circuit, or hardware gate, to prevent unwanted access. This hardware gate ensures only authorized programs have access to the protected portions of the memory.

Prior art hardware gates included specific memory addresses that were written to in order to open or close the gate. When the specific memory address is addressed, a shadow register or latch is written to, changing the output of the hardware latch to either enable or disable the write operations. The hardware latch is designed to power up in the "closed" state—the state that prevents write operations in protected areas of memory—to prevent write operations from occurring as soon as the system is powered on.

A second type of prior art hardware gate requires a write operation to occur after a certain event. For example, one prior art system required a number of operations to be executed from the protected memory block. This increases the protection provided by the hardware gate, but could still be defeated.

An improved hardware gate requires a specific sequence of instructions to be executed in order to change the state of the latch. This sequence of instructions is selected to be an uncommon sequence since inadvertent execution of the sequence will accidentally change the latch. The sequence should be a sequence that would not normally be programmed, and any code should be checked to ensure the code does not accidentally execute the sequence and change the latch.

Figure 2:
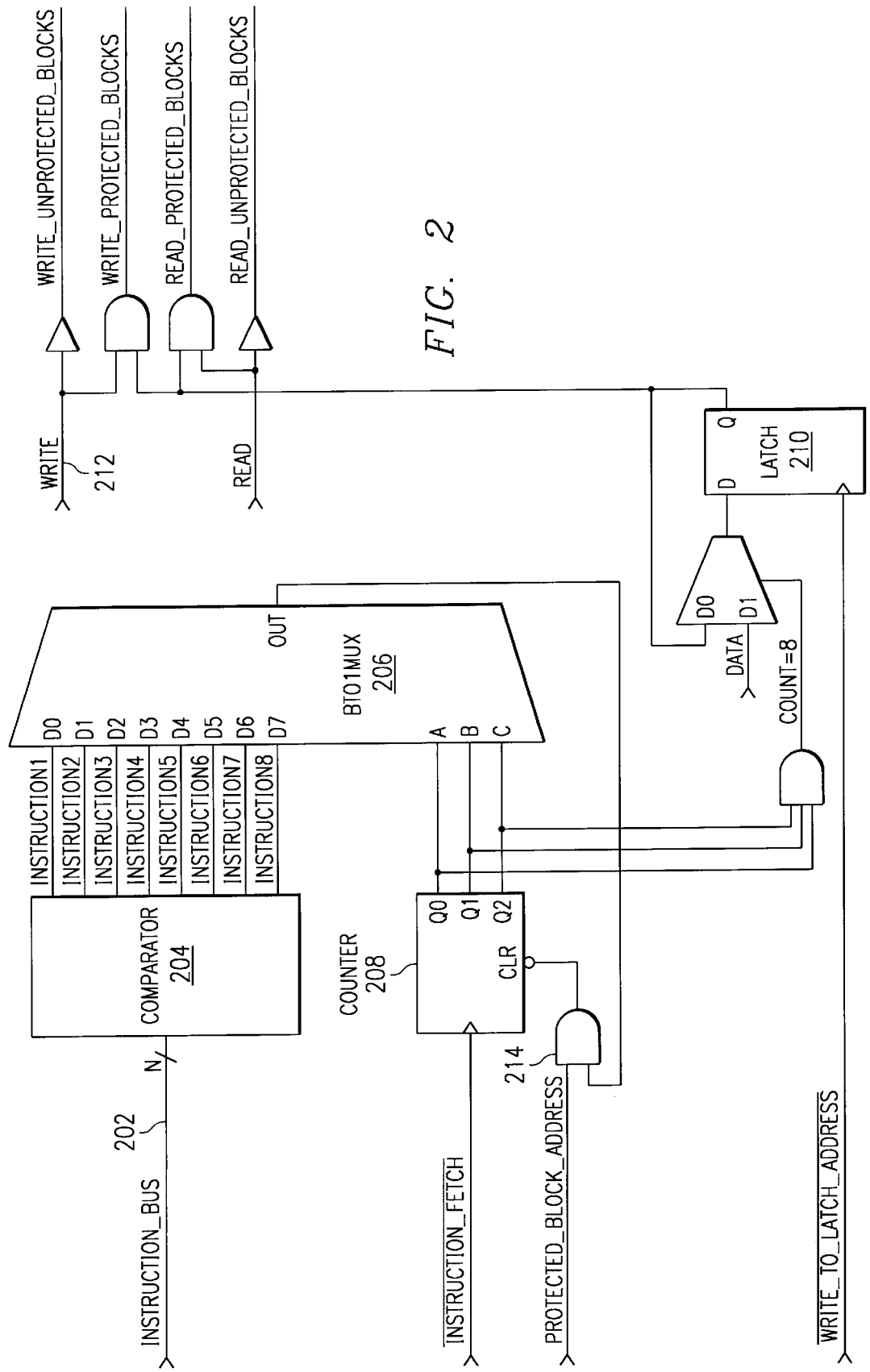
FIG. 2 is schematic diagram illustrating one example of a memory controller to limit access to particular portions of memory.

FIG. 2 is a schematic diagram of the basic components used for one implementation of the novel hardware latch described herein. The schematic of FIG. 2 is provided merely to illustrative the function of the hardware gate and is not intended to represent the actual circuitry used to implement the hardware gate. The actual circuitry used to implement the hardware latch will be selected and optimized by the system designer.

In FIG. 2, an N-bit bus provides the instructions executed by the system to a combinatorial logic block 204. The entire instruction bus does not need to be provided to the combinatorial logic block 204, but if the entire bus is not provided the logic block may not be able to ensure that only a single sequence of instructions is able to unlock the hardware gate. The combinatorial logic block 204 shown in FIG. 2 provides eight separate outputs. Other systems may include less than or more than eight instructions and would therefore have less than or more than eight outputs. The combinatorial logic block 204 functions as a series of comparators. One input of each comparator is connected to the instruction bus, the other input to each comparator is hardwired to indicate the pattern that appears on the bus when a particular instruction is executed. The output from a given comparator is active when that particular instruction is applied to the instruction bus 202. The outputs are arranged in the order in which the corresponding instructions must be executed.

A counter 208 counts the instructions and selects which output from the combinatorial logic block should be selected by multiplexer 206. If the output of the multiplexer is logic false, the sequence of instructions is broken and the counter 208 is reset. If the output of the multiplexer is logic true, the counter is allowed to continue incrementing. If the counter reaches eight, the hardware gate can then be modified prior to the next instruction. Instruction 8 should be the command to write to the hardware gate. The output of the flip-flop 210 is gated with the read and write signals provided to the protected blocks to prevent the read and write operations when the gate is locked. Another logic gate 214 is provided to reset the counter if the instructions are executed out of a section of memory other than one of the protected blocks. This prevents programs loaded by the user from opening the hardware gate.

Figure 5A:
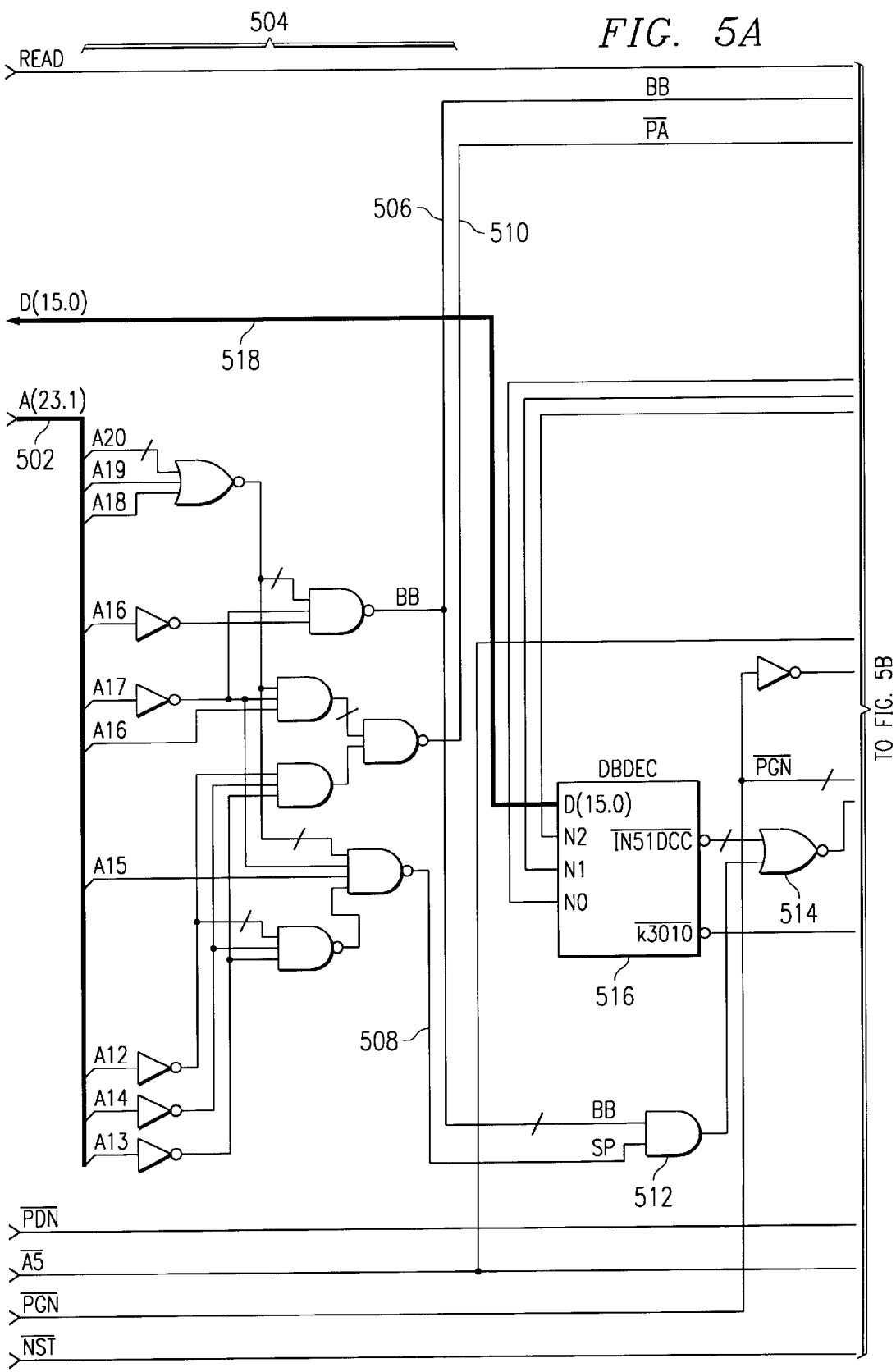
FIG. 5 is a schematic diagram showing an alternative embodiment of the memory controller of FIG. 2.
Figure 5B:
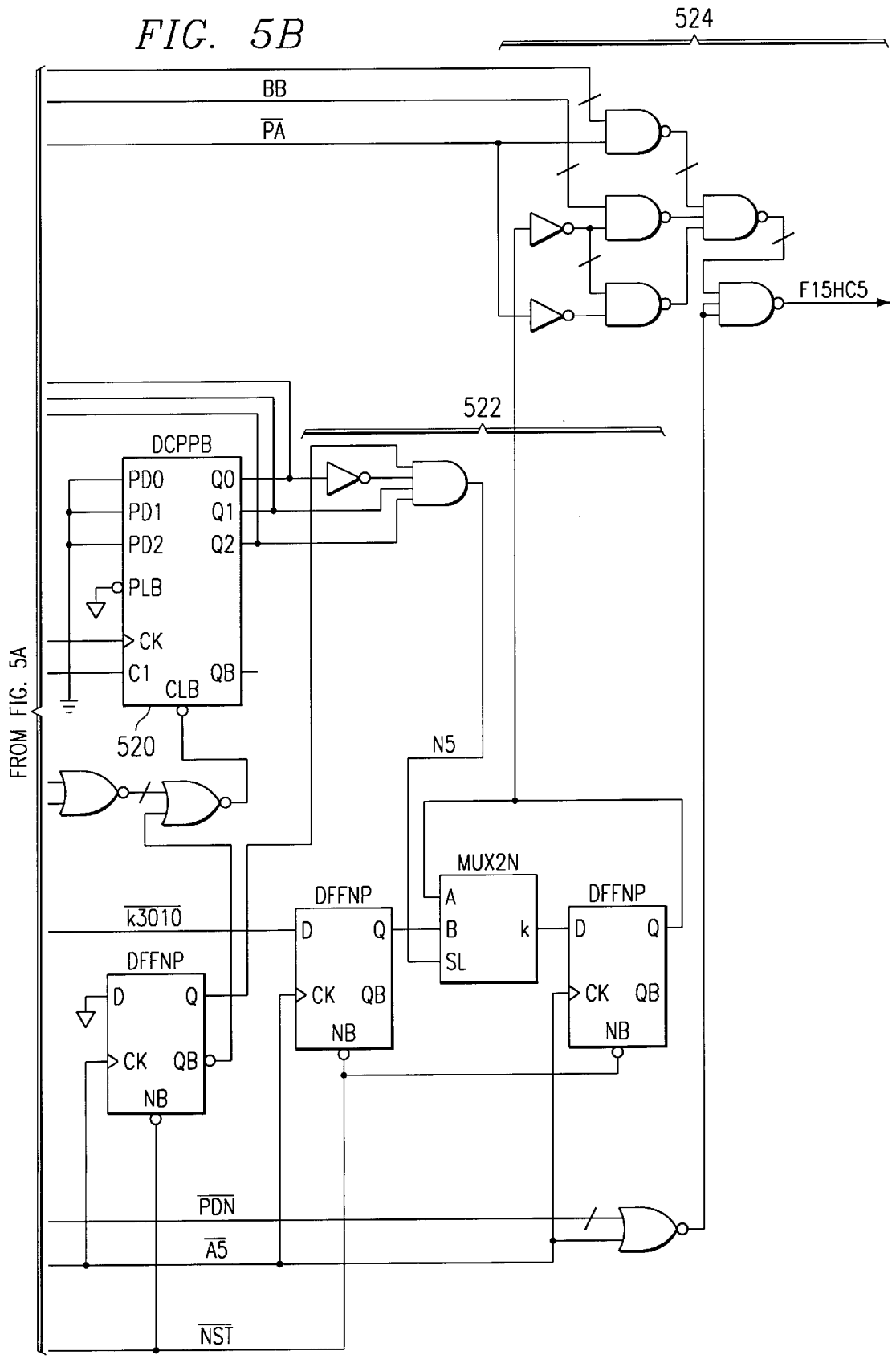

FIG. 5 is a schematic view of one implementation of the memory controller of FIG. 2. In FIG. 5, the address bus is input to logic gates 504 that decode which portion of the system memory is being addressed. Three address indicator signals exit the address decode logic gates. A first signal 506 is active low when the boot block (shown as 102 in FIG. 1) is addressed. A second signal 508 is active low when the system privileged block (shown as 104 in FIG. 1) is addressed. A third signal 510 is active low when the program authentication block (shown as 106 in FIG. 1) is addressed.

When either the boot block or system privileged block are addressed the output of AND gate 512 is low, enabling NOR gate 514 to invert the output of the logic block 516. Logic block 516 receives the instruction bus 518 and the output of a counter 520. As described above, logic block 516 monitors the instructions on the instruction bus to detect when selected instructions are executed. The output of the counter 520 is used to select which instruction is being detected. When the last instruction in the sequence is detected, the hardware gate 522 can be changed. The output of the hardware gate is used by logic gates 524 to enable the protected memory blocks, as well as the unprotected memory blocks, to be read from and written to when the hardware gate is open.

Figure 3:
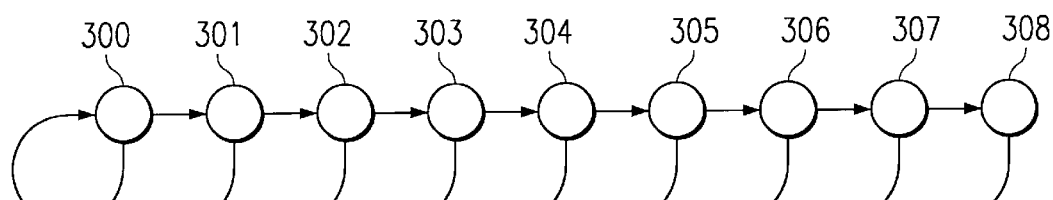
FIG. 3 is a state diagram illustrating the operation of the memory controller of FIG. 2.

FIG. 3 is a state diagram showing the operation of the hardware gate. On power up, the system is in state 300 of FIG. 3. If the first instruction in the sequence is executed from the proper memory area, the system moves to state 301. If the first instruction is not executed, or if the first instruction is not executed from the proper memory area, the system remains in state 300. When the system is in state 301 and the second instruction in the sequence is executed from the proper memory area, the system will move to state 302, otherwise the system reverts to state 300. This progression continues through states 303, 304, 305, 306, and 307. When the system is in state 307 and the eight instruction in the sequence is executed from the proper memory area, the system moves state 308 which allows the hardware gate to be written to and then returns to state 300. If the system is in a state other than state 300, and the first instruction in the sequence is executed from the proper memory area, the system will return to state 300 and advance to state 301 since the first instruction is being executed. Of course, any length sequence of instructions can be used. Generally, the longer the sequence the better the protection. Eight instructions are preferred since eight is enough to prevent arbitrary activation of the hardware gate, yet beyond that length produces limited additional security.

The hardware latch described above enables the commercial creation and distribution of aftermarket software for handheld devices. Specifically, the hardware latch provides sufficient security to make it economically feasible to produce and distribute software packages for handheld calculators. The hardware latch severely limits access to protected areas of system memory. These protected areas include programs to verify secure digital signatures of the aftermarket programs using common public-key/private-key cryptography technologies. This cryptographic digital signature scheme, coupled with the individual serial numbers encoded in the memory of each calculator, enables software vendors to provide the aftermarket software in a format that is unusable on any calculator except the one for which the software has been purchased.

Figure 4:
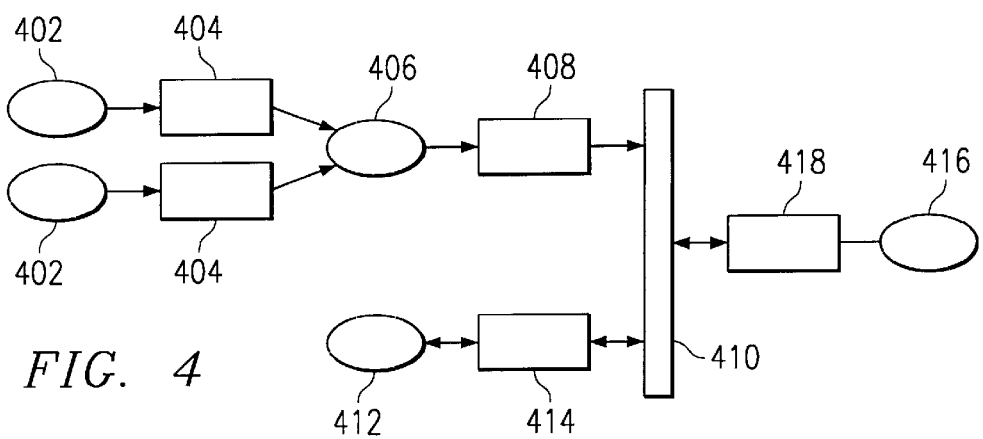
FIG. 4 is a schematic diagram showing a distribution model enabled by the memory controller of FIG. 3.

FIG. 4 is a schematic diagram of the software distribution process. In FIG. 4, the author 402 of a program provides the program 404 to a controller 406. The controller typically is the hardware provider. The controller 406 verifies the program and adds a program ID and software digital signature using the controller's private encryption key. The software with the program ID and software signature 408 is distributed through the channel 410, which includes email, internet, and optical or magnetic media.

When a purchaser 412 purchases the software 408, they provide information, typically the unique serial number of the device, about the device that will install the software to the controller. The controller adds the information matching the software to the hardware device serial number in the controller's database 414. This generates a certificate authorizing software 408 to be run on the hardware device with the unique hardware serial number, which is also signed with the controller's private key. The certificate is transferred to the hardware owner 416, who typically is also the purchaser 412, through the channel 410. The hardware owner 416 downloads the software 408 to the hardware device 418. The hardware device 418 authenticates the certificate using the public key associated with the controller's private key. If the certificate authorizes the specific hardware device 418 to install the software 408 and the serial number matches, the hardware gate is opened and the software is installed, typically in a protected portion of the device memory. The installation routine then closes the hardware gate.

Most advanced calculators are programmable. This requires the user be given access to at least some of the system memory in order to save the user program. User programs are stored in an unprotected block, shown as 110 in FIG. 1. Operations executed from the unprotected blocks are restricted to ensure the user programs are not able to download the protected memory blocks. In addition to user programs, downloaded programs that are freely executable can also be stored in unprotected memory blocks.

Thus, although there has been disclosed to this point a particular embodiment for a system and method of limiting access to system memory, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A method of limiting access to memory comprising the steps of:
   providing a memory;
   providing a logic gate to prevent write operations to said memory, said step of providing a logic gate comprising:
      providing a counter to track the state of the logic gate;
      providing a series of comparators to compare the current instruction with a series of instruction patterns;
      providing a multiplexer to select an output from a selected comparator based on the state of the counter, said multiplexer resetting said counter upon a mismatch as indicated by said selected comparator; and
      providing a latch that is written to when said counter reaches a predetermined count; and
   providing an access signal to enable write operations to said memory when said latch is in a predetermined state.

2. The method of claim 1, said step of providing an access signal requiring execution of a sequence of eight instructions.

3. The method of claim 1, said step of providing an access signal requiring execution of a specific sequence of instructions to occur from a specific region of said memory.

4. The method of claim 1, said step of providing a memory comprising providing a memory comprising a system portion and a secure portion, wherein said access signal enables write access to said secure portion.

5. An electronic device having a memory system, said memory system comprising:
   a block of memory; and
   a memory controller comprising:
      a counter to track the state of said memory controller;
      a series of comparators to compare a current instruction with a series of instruction patterns;
      a multiplexer to select an output from a selected comparator based on the state of said counter, said multiplexer resetting said counter upon a mismatch as indicated by said selected comparator; and
      a latch that is written to when said counter reaches a predetermined count;
   said memory controller only allowing write access to said block of memory when said latch is in a predetermined state.

6. The electronic device of claim 5, said block of memory comprising an unprotected block and a protected block, said memory controller only allowing write access to said protected block upon the execution of a predetermined sequence of eight instructions stored in said protected block.

7. The electronic device of claim 5, said block of memory comprising an unprotected block and a protected block, an output of said latch gating a write enable signal to said protected block of memory.

8. The electronic device of claim 5, said block of memory comprising an unprotected block and a protected block, said memory controller only allowing write access to said protected block upon the execution of said predetermined sequence of instructions stored in said protected block.

9. The electronic device of claim 5, said memory controller only setting said latch in an open state upon the execution of a predetermined sequence of eight instructions.

10. The electronic device of claim 5, wherein said electronic device is a calculator.

11. The electronic device of claim 5, wherein said memory is non-volatile memory.

* * * * *

UNITED STATES PATENT AND TRADEMARK OFFICE
CERTIFICATE OF CORRECTION

PATENT NO. : 6,643,751 B2
DATED : November 4, 2003
INVENTOR(S) : Russell M. Rosenquist and David D. Baker It is certified that error appears in the above-identified patent and that said Letters Patent is hereby corrected as shown below:

<u>Title page,</u>
Insert Item -- Related U.S. Application Data
[60]   Provisional Application No. 60/190,658 Mar. 20, 2000 and Provisional
        Application No. 60/250,521 Nov. 30, 2000. --.

Signed and Sealed this

Fifteenth Day of November, 2005

JON W. DUDAS
*Director of the United States Patent and Trademark Office*